(12) United States Patent
Yedavalli et al.

(10) Patent No.: US 10,389,594 B2
(45) Date of Patent: Aug. 20, 2019

(54) ASSURING POLICY IMPACT BEFORE APPLICATION OF POLICY ON CURRENT FLOWING TRAFFIC

(71) Applicant: Cisco Technology, Inc., San Jose, CA (US)

(72) Inventors: Kiran Kumar Yedavalli, San Jose, CA (US); Shyamsundar Nandkishor Maniyar, San Jose, CA (US); Sanjay Kumar Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 15/460,620

(22) Filed: Mar. 16, 2017

(65) Prior Publication Data

US 2018/0270133 A1 Sep. 20, 2018

(51) Int. Cl.
*H04L 12/24* (2006.01)
*H04L 12/26* (2006.01)
*H04L 12/70* (2013.01)
*H04L 12/701* (2013.01)

(52) U.S. Cl.
CPC ...... *H04L 41/0893* (2013.01); *H04L 41/0853* (2013.01); *H04L 43/026* (2013.01); *H04L 45/00* (2013.01); *H04L 47/00* (2013.01); *H04L 43/08* (2013.01)

(58) Field of Classification Search
CPC .................. H04L 43/0876; H04L 41/0866
USPC ....................................... 370/252
See application file for complete search history.

(56) References Cited

U.S. PATENT DOCUMENTS

| 6,816,903 | B1 * | 11/2004 | Rakoshitz | H04L 41/5003 370/230 |
| 8,321,867 | B1 * | 11/2012 | Holl, II | G06F 3/0605 714/48 |
| 9,443,093 | B2 * | 9/2016 | Roth | G06F 21/64 |
| 9,553,845 | B1 * | 1/2017 | Talmor | H04L 63/0263 |
| 2003/0212775 | A1 * | 11/2003 | Steele | G06F 8/60 709/223 |
| 2005/0091396 | A1 * | 4/2005 | Nilakantan | H04L 45/04 709/232 |
| 2006/0150157 | A1 * | 7/2006 | Fellenstein | G06F 9/5072 709/201 |
| 2006/0218302 | A1 * | 9/2006 | Chia | H04L 47/10 709/245 |
| 2009/0168645 | A1 * | 7/2009 | Tester | H04L 41/0677 370/225 |
| 2009/0327909 | A1 * | 12/2009 | Hayton | G06F 21/6218 715/744 |
| 2011/0047125 | A1 * | 2/2011 | Matsumoto | H04L 41/0893 707/609 |

(Continued)

*Primary Examiner* — Peter G Solinsky

(74) *Attorney, Agent, or Firm* — Edell, Shapiro & Finnan, LLC

(57) ABSTRACT

Presented herein are techniques for determining the impact a policy change might have on a network. The techniques include receiving configuration information from a plurality of network devices in a network, receiving traffic flow records from the plurality of network devices, receiving an indication of an intent to apply a new policy on the network devices, and based on the configuration information, traffic flow records and the new policy, determining an impact of the new policy on the network devices and traffic flowing through the network.

18 Claims, 6 Drawing Sheets

(56) References Cited

U.S. PATENT DOCUMENTS

| | | | |
|---|---|---|---|
| 2011/0060713 A1* | 3/2011 | Harrison | G06F 21/604 706/47 |
| 2012/0226895 A1* | 9/2012 | Anderson | G06F 21/575 713/2 |
| 2013/0117847 A1* | 5/2013 | Friedman | H04L 63/102 726/22 |
| 2013/0297769 A1 | 11/2013 | Chang et al. | |
| 2014/0115137 A1* | 4/2014 | Keisam | H04L 12/6418 709/223 |
| 2014/0269252 A1* | 9/2014 | Anumala | H04L 41/0813 370/216 |
| 2015/0067171 A1* | 3/2015 | Yum | G06F 9/5072 709/226 |
| 2016/0127204 A1* | 5/2016 | Ozaki | H04L 43/04 709/224 |
| 2016/0191349 A1 | 6/2016 | Buege | |
| 2016/0294691 A1 | 10/2016 | Joshi | |
| 2016/0359912 A1 | 12/2016 | Gupta et al. | |
| 2017/0091204 A1* | 3/2017 | Minwalla | G06F 17/30241 |
| 2017/0237760 A1* | 8/2017 | Holeman | H04L 43/0876 726/22 |
| 2017/0308602 A1* | 10/2017 | Raghunathan | G06F 17/30575 |
| 2017/0310768 A1* | 10/2017 | Raleigh | H04L 67/16 |
| 2018/0006948 A1* | 1/2018 | Torvi | H04L 41/0896 |
| 2018/0097778 A1* | 4/2018 | Jain | H04L 69/22 |
| 2018/0115927 A1* | 4/2018 | Vesterinen | H04W 36/0055 |
| 2018/0123941 A1* | 5/2018 | Flamini | H04L 45/02 |

* cited by examiner

| DEVICE | CONFIGURATION | FLOWS |
|---|---|---|
| 1 | TCAM1<br>PROCESSOR1<br>BANDWIDTH1 | FLOW1<br>FLOW2<br>⋮<br>FLOWN |
| 2 | TCAM2<br>PROCESSOR2<br>BANDWIDTH2 | FLOW1<br>FLOW2<br>⋮<br>FLOWN |

FIG.4

ASSURING POLICY IMPACT BEFORE APPLICATION OF POLICY ON CURRENT FLOWING TRAFFIC

TECHNICAL FIELD

The present disclosure relates to computer networks, and more specifically to analyzing the impact of a new policy on traffic flow.

BACKGROUND

With the growing demand of clustered storage and computing, network security policy management has become an important issue for modern data networks. Network security policies define network architecture, govern data access and safeguard the system integrity of datacenters or enterprise networks.

It remains a challenge to manually manage the large number of network security policies. Even small datacenters could potentially implement hundreds or thousands of policies. Further, various changes to the network (e.g., adding or removing a security policy, modifying one or more endpoint groups, etc.) can result in network latency or even network failures.

BRIEF DESCRIPTION OF THE DRAWINGS

FIG. 4 depicts an example data storage scheme with which policy impact logic may operate in accordance with an example embodiment.

DESCRIPTION OF EXAMPLE EMBODIMENTS

Overview

Presented herein are techniques for determining the impact a policy change might have on a network by receiving configuration information from a plurality of network devices in a network, receiving traffic flow records from the plurality of network devices, receiving an indication of an intent to apply a new policy on the network devices, and based on the configuration information, traffic flow records and the new policy, determining an impact of the new policy on the network devices and traffic flowing through the network.

Also presented herein is a device that includes an interface unit configured to enable network communications, a memory, and one or more processors coupled to the interface unit and the memory, and configured to: receive configuration information from a plurality of network devices in a network, receive traffic flow records from the plurality of network devices, receive an indication of an intent to apply a new policy on the network devices, and based on the configuration information, traffic flow records and the new policy, determine an impact of the new policy on the network devices and traffic flowing through the network.

Example Embodiments

Figure 1:
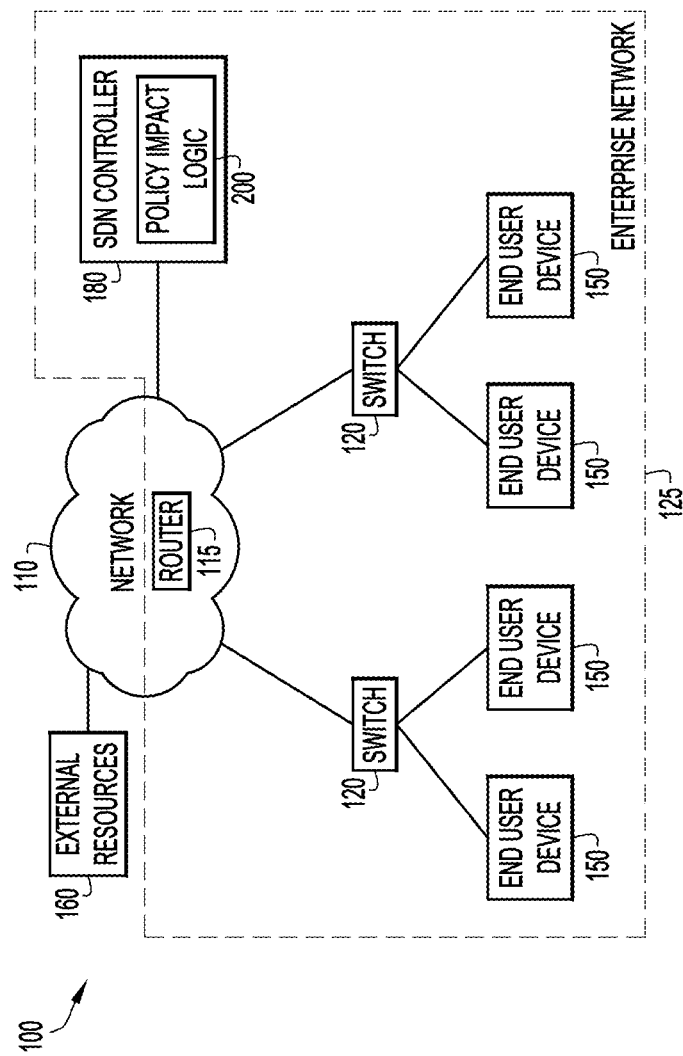
FIG. 1 depicts a network topology including policy impact logic deployed on a network element in accordance with an example embodiment.

FIG. 1 depicts a network topology 100 including policy impact logic 200 deployed on a network element in accordance with an example embodiment. More specifically, a data network 100, such as a packet network, includes a network 110, such as the Internet, a wide area network (WAN), local area network (LAN), private network, etc. and at least one router 115. In communication with network 110 are at least one network device (e.g., switch, router, Access point, hereinafter "switch") 120 via which end user devices 150 (e.g., computers, servers, wireless devices, laptop computers, tablet computers, mobile phones, etc.) can communicate with network 110 and with each other.

For example, an end user device 150 might want to share information with another end user device 150, or share or obtain information with/from external resources 160 (e.g., web sites, remote servers, etc.) which are also in communication with network 110.

As shown, router 150 (which could be an edge router), switches 120 and end user devices 150 may all be considered to be part of an enterprise network 125. Such an enterprise network 125 may be physically distributed, but logically grouped and managed as a single entity. A software defined network (SDN) controller 180, for example, may be employed to manage enterprise network 125 by applying appropriate policies to, e.g., router 115 and/or switches 120 to ensure access by end user devices 150 is managed properly, including accounting for security concerns.

As further shown in FIG. 1, policy impact logic 200 is deployed as part of SDN controller 180. As will be explained in more detail herein, policy impact logic 200 is configured to analyze a given proposed or intended policy change to determine the impact such a policy change might have on traffic flowing in the enterprise network 125 and whether given network elements, such as switches 120 and router 115, can accommodate the policy change in view of the resources available on those network elements. Although policy impact logic 200 is shown as deployed on SDN controller 180, those skilled in the art will appreciate that policy impact logic could be deployed on any component as long as access to enterprise network 125 is available, consistent with the functionality described below.

Figure 2:
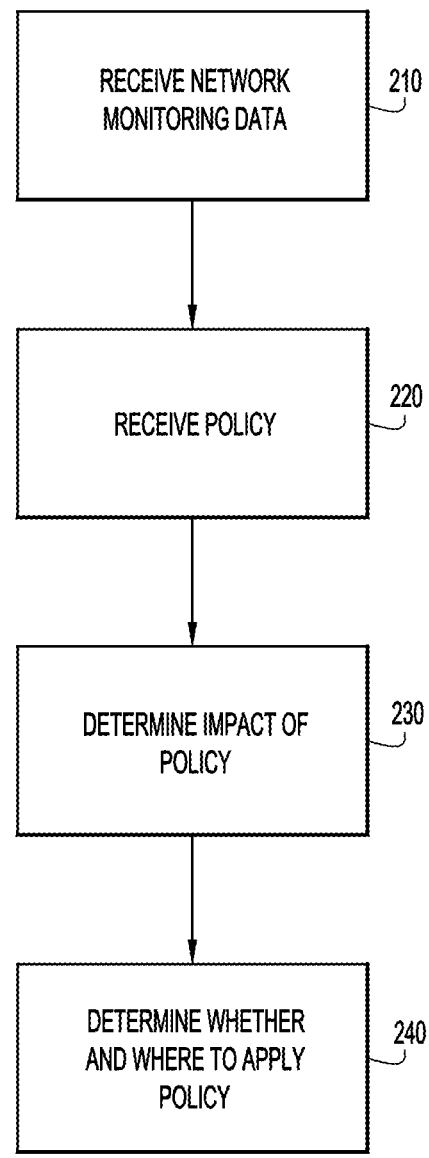
FIG. 2 is a flow chart depicting a series of operations that may be performed by the policy impact logic in accordance with an example embodiment.

FIG. 2 is a flow chart depicting, at a high level, a series of operations that may be performed by policy impact logic 200 in accordance with an example embodiment. At 210, network monitoring data is received. For example, network monitoring data may be received from a performance management system that collects network data regarding system components in enterprise network 125. The performance management system may collect various information regarding each component or element in enterprise network 125, including utilization rates, specifications, configurations, and information regarding traffic flow through enterprise network 125, and through each network element (e.g., router 115, switches 120). For example, network Internet Protocol (IP) packet information may be collected and stored in a performance management database. Other various systems may access this data for use in various other management and monitoring processes.

One such performance management system that is suitable to employ in connection with the instant embodiments is NetFlow. NetFlow is a feature that provides the ability to collect IP network traffic as it enters an interface. By analyzing the data provided by NetFlow, a network administrator can determine characteristics of flows such as source and destination of traffic, and class of service, among other characteristics. More specifically, a given NetFlow record might include, for a given sequence of packets, (1) ingress interface, (2) source IP address, (3) destination IP address, (4) IP protocol, (5) source port, (6) destination port, and (7) IP type of service. More or fewer characteristics may be captured depending on the context and preferences of a given network administrator. In accordance with the embodiments described herein, IP packet information regarding traffic flows are received from each, or any number of, network elements or devices within enterprise network 125.

Referring still to FIG. 2, at 220, a proposed network policy is received. Because of the expansive and complex nature of enterprise network 125, a network administrator may not understand the impact a new, proposed, policy will have on network traffic flows, or on network devices themselves. That is, if a proposed policy were implemented, traffic could end up unintentionally exceeding the bandwidth of network segments within enterprise network 125, or exceeding the capabilities or resources of selected network devices within enterprise network 125. For example, a new policy might be to "allow video streaming", or "allow access to social media." Another new policy might be to prohibit access to certain IP addresses or port numbers, thereby requiring increased matching operations in ternary content-addressable memory (TCAM) of a given switch. Thus, and in accordance with the embodiments described herein, at 230, the impact of the policy is determined. Determining impact in this context may be of two types: determining the impact on flows passing through enterprise network 125, and determining the impact on individual network devices or components in enterprise network 125.

Once the foregoing determinations are made, at 240 it is determined whether and where (i.e., on which network devices) to apply the proposed policy in the enterprise network 125. In some instances, the proposed policy is applied in its original form, in other instances the proposed policy may be modified before being applied, and in still other instances the proposed policy might not be applied at all in view of the determined detrimental impact it may have on network operations. In some instances, switch or router configurations and/or hardware may be modified to accommodate the proposed policy, whereupon the proposed policy may be applied.

Figure 3:
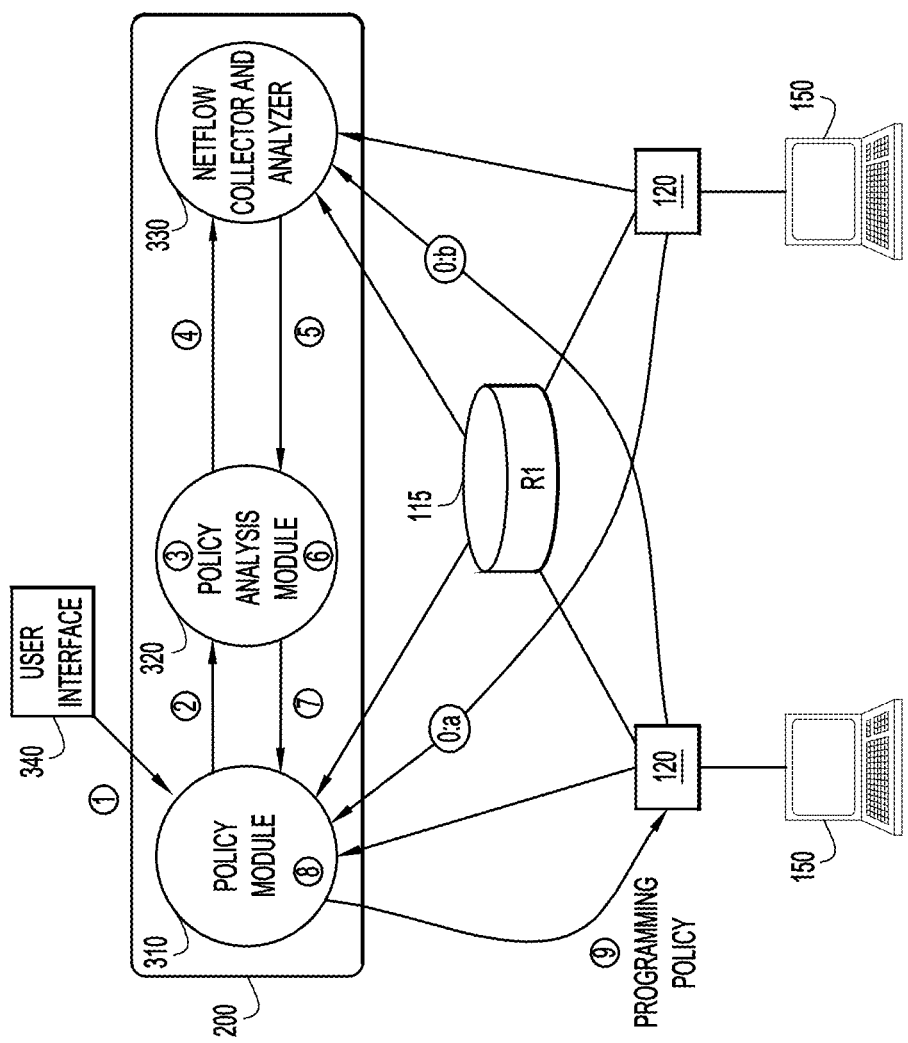
FIG. 3 illustrates an example implementation of the policy impact logic in accordance with an example embodiment.

FIG. 3 illustrates an example implementation of policy impact logic 200 in accordance with an example embodiment. As shown, policy impact logic 200 includes a policy module 310, a policy analysis module 320, and a NetFlow collector and analyzer 330. Also shown is a user interface (UI) 340 that enables an administrator, for example, to interact with policy impact logic 200. Still further shown are router 115, switches 120 and end user devices 150, like those shown in FIG. 1.

Policy module 310 is a repository of policies that are implemented in enterprise network 125. Such polices may be implemented by configuring or programming router 115 and/or switches 120 to allow those devices to permit, throttle or deny certain traffic flows to and from end users 150. NetFlow collector and analyzer 330 is a repository for NetFlow records such as those described above. Although a NetFlow collector and analyzer is depicted, those skilled in the art will appreciate that other systems may be used to collect traffic flow information from the several network elements within enterprise network 125. In one possible implementation, NetFlow collector and analyzer 330 stores NetFlow records in a database like that shown in FIG. 4, which depicts an example data storage scheme with which policy impact logic 200 may operate in accordance with an example embodiment.

As shown in FIG. 4, the data storage schema might be arranged or sorted by network device, such as router 115 or each switch 120. Thus, for each such device, a configuration of the device may be stored. The configuration data may comprise amount of memory, such as TCAM, processing power, bandwidth available, stateful inspection capabilities, traffic copy capabilities and traffic redirect capabilities) for the given device. Also stored may be the plurality of flows, e.g., Flow1, Flow2, FlowN. Each of these flows may be represented by the several characteristics discussed above.

Referring again to FIG. 3, several different operations 0-9 are depicted. As noted, a goal of the embodiments described herein is to allow a network administrator to analyze the impact of a new or proposed policy before it is orchestrated across enterprise network 125. The granularity of the impact may be at the network as well as at a per device (port) level.

At operation 0(a), resources and configuration information is provided to policy module 310 from each network device, e.g., router 115 and each switch 120 (in this example), in enterprise network 125. This resource information may include the state of the network device, its memory (TCAM) resources, its processing power, stateful feature support and/or its configuration vis-à-vis the enterprise network (e.g., hierarchical relationship with other network elements), etc. At operation 0(b), the network elements generate traffic flow records (e.g., NetFlow records) that represent traffic flowing through the respective network elements.

At operation 1, an administrator, using user interface 340 expresses an intent to change, add or delete a policy, and that expression of intent is received by policy module 310. At operation 2, the policy module 310 sends the proposed or intended new policy to the policy analysis module 320. At operation 3, the policy analysis module analyzes the policy to determine which traffic flows might be needed for analysis in order to evaluate the impact the new policy might have on the network, e.g., to determine which network elements might be targeted to have the new policy instantiated thereon. At operation 4, policy analysis module 320 requests the relevant traffic flows from NetFlow collector and analyzer 330. At operation 6, NetFlow collector and analyzer 340 provides the requested traffic flows to policy analysis module 320. At operation 6, policy analysis module matches the received flows with the new policy and generates a result based on its analysis.

In an embodiment, policy analysis module 320 can process data it receives from NetFlow collector and analyzer 340 or any other source of data. For example, policy analysis module can be configured to determine dependencies of components within enterprise network 125. For example, if network device A routinely sends data to network device B, but network device B never sends data to network device A, then policy analysis module 320 can determine that network device B is dependent on network device A, but network device A is likely not dependent on network device B. Once policy analysis module 320 determines network device dependencies, it can then form a device dependency map. This map can be instructive when policy analysis module 320 operates to predict what will happen upon instantiation of a given new policy. In another example, if the network device A communicates with network device B only when a connection is instantiated by network device B, and there is no need to start a connection from network device A, then, it could be inferred that in such cases a stateful policy which allows communication from network device A to network device B should be deployed based on the traffic originating from network device B first.

The outcome of the analysis performed by policy analysis module 320 may be two fold. First, the analysis can reveal the impact on traffic when the new, proposed, policy is applied or instantiated on different network elements. Second, the analysis can reveal how the resources on selected or given network devices might be impacted by the new, proposed, policy.

At operation 7, the policy analysis module 320 sends the result of its analysis to the policy module 310. At operation 8, the policy module 310 uses the information from the policy analysis module 320 and the known resources and configuration information about each network element to determine if the policy can be instantiated without detrimental impact. An error message or other notification may be provided via user interface 340 to an administrator to alert the administrator as to whether the proposed policy should be permitted or not, and/or what changes might be advisable to assist in instantiating the policy.

At operation 9, and assuming the proposed policy is viable, the policy module 310 pushes the policy to (i.e., configures, programs, etc.) individual network elements.

Thus, the methodology described herein analyzes a proposed policy for both impact on traffic and network element resources before instantiating the policy on the network elements. This methodology is non-intrusive in regard to the network elements, provides a mechanism by which the network elements can be analyzed without changes to the network elements, and can help to avoid negative or detrimental effects of a policy change since the analysis is completed before the policy is instantiated.

Figure 5:
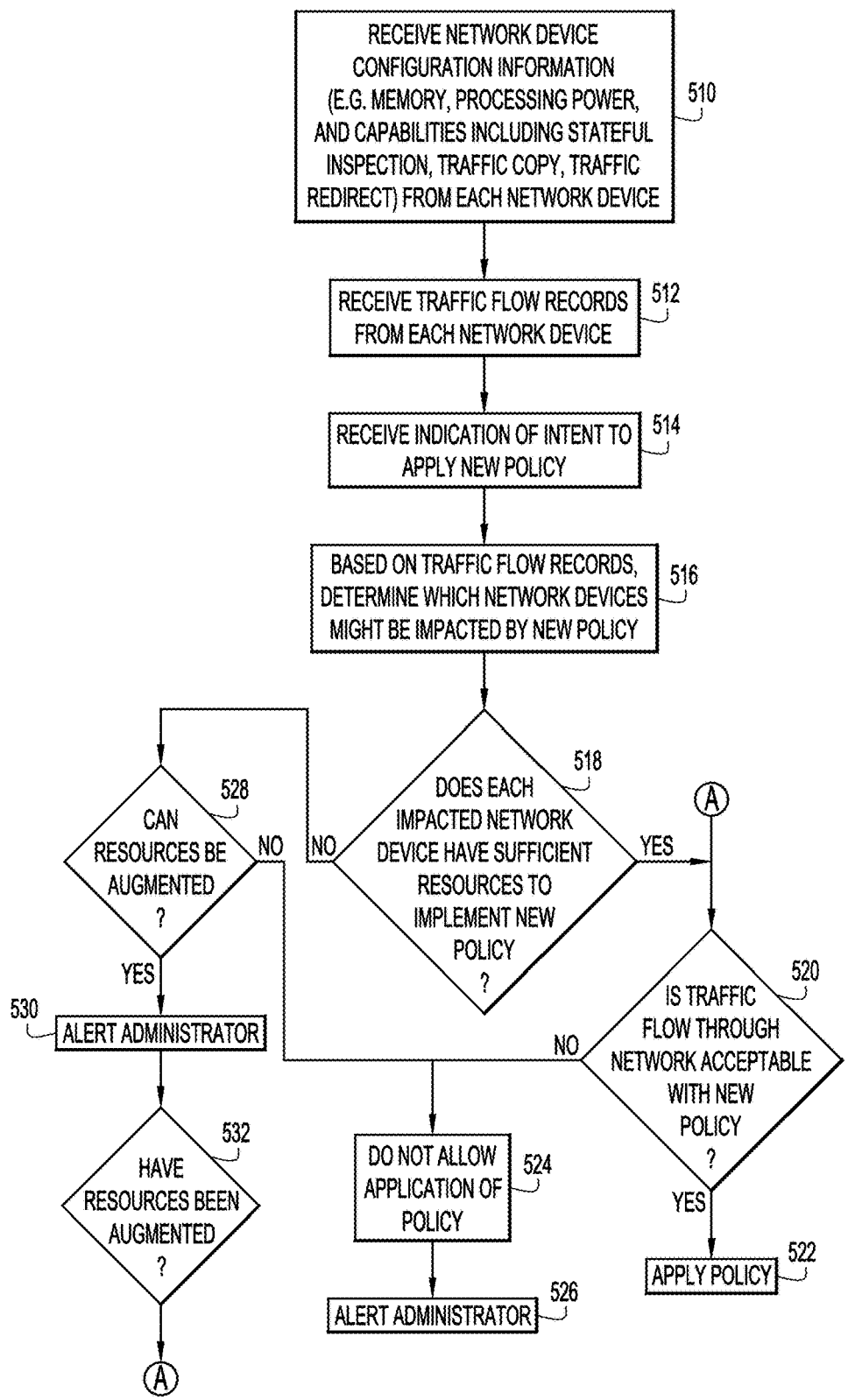
FIG. 5 is a more detailed flow chart depicting a series of operations that may be performed by the policy impact logic in accordance with an example embodiment.

FIG. 5 is a more detailed flow chart depicting a series of operations that may be performed by policy impact logic 200 in accordance with an example embodiment. At 510 network device configuration information is received. Such information may comprise memory resources, processing power, stateful inspection capabilities, traffic copy capabilities and traffic redirect capabilities, and any other relevant configuration information related to respective network elements or components. At 512, traffic flow records are received from each network device. Such records may be in the form of NetFlow records and include, among other characteristics, a 5-tuple, i.e., source IP address/port number, destination IP address/port number and the protocol in use. At 514, an indication of an intent to apply a new policy is received. Such an indication may be received via a user interface presented to a network administrator. At 516, based on traffic flow records, it is determined which network devices might be impacted by the new policy. At 518, it is determined whether each network device that is likely to be impacted by the new policy has sufficient resources to implement the new policy. If sufficient resources are available, then at 520 it is determined whether traffic that is to flow through the network, as a result of the new policy, is acceptable, i.e., whether the network can support the new or proposed policy. The resources calculated for applying the policy may include factors such as available link bandwidth, CPU load, memory usage, available TCAM space, scale support of multiple features like stateful inspection, copy capabilities, and/or redirect capabilities of the network device.

If the traffic flow through the network, as a result of the new policy, is deemed to be acceptable, then at 522, the policy can be applied by, e.g., pushing the policy to some or all of the several network devices in the enterprise network. If the traffic flow through the network, as a result of the new policy is deemed not to be acceptable, then at 524, the policy is not applied, or indicated as being not advisable to be applied, and at 526 an appropriate alert to an administrator can be sent.

If, at 518, one or more network devices do not have sufficient resources to implement the new policy, then at 528 it is determined whether identified/selected network devices can be augmented to accommodate the new policy. If augmenting a network device is possible (e.g., by adding memory, upgrading a processor, etc.), then at 530, an appropriate alert in this regard can be sent to an administrator. This can give the administrator sufficient time to complete whatever equipment/configuration upgrade that might be advisable. If at such later time, and at 532, the resources have been sufficiently augmented, then operation 520 can again be performed to determine if the network traffic flow as a result of the new policy is acceptable. If after some predetermined period of time (e.g., hours, days, weeks, etc.) it is determined at 532 that the resources of network devices have not been sufficiently augmented to support the new policy, then at 524 and 526 it is established to not allow instantiation of the new policy and an administrator is alerted accordingly.

Figure 6:
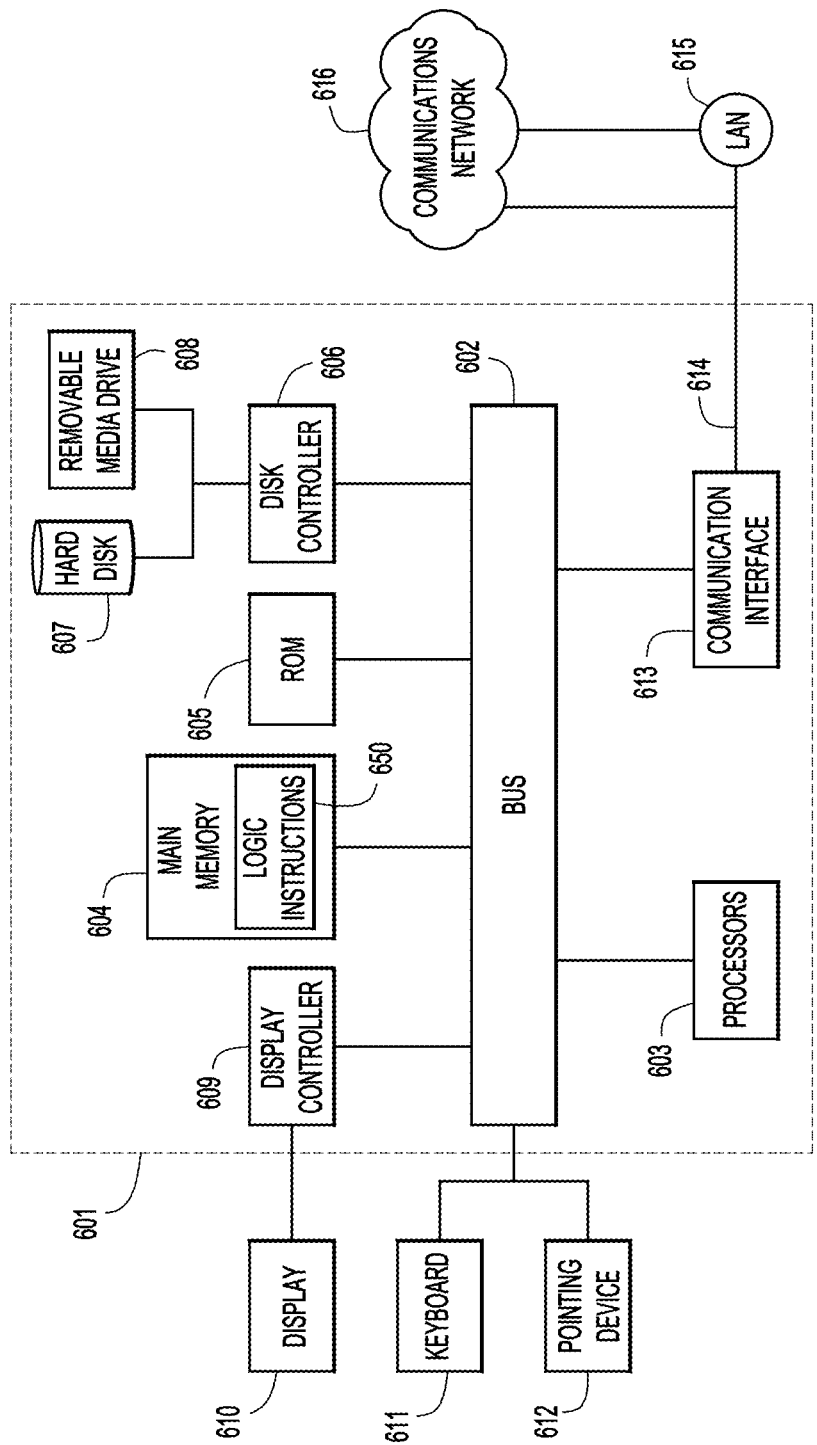
FIG. 6 depicts a device (e.g., a software defined network controller) on which aspects of the several described embodiments may be implemented.

FIG. 6 depicts a device (e.g., a software defined network controller) on which aspects of the several described embodiments may be implemented.

The apparatus may be implemented on or as a computer system 601. The computer system 601 may be programmed to implement a computer based device. The computer system 601 includes a bus 602 or other communication mechanism for communicating information, and a processor 603 coupled with the bus 602 for processing the information. While the figure shows a single block 603 for a processor, it should be understood that the processor 603 represents a plurality of processors or processing cores, each of which can perform separate processing. The computer system 601 may also include a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions (e.g., the logic to perform the operations of FIGS. 1-5 described throughout and indicated as logic instructions 650) to be executed by processor 603. In addition, the main memory 604 may be used for storing temporary variables or other intermediate information during the execution of instructions by the processor 603.

The computer system 601 may further include a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 may also include a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a cathode ray tube (CRT), liquid crystal display (LCD), light emitting diode (LED) display, etc., for displaying information to a computer user. The computer system 601 may include input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing operations of the embodiments described herein in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the described embodiments, and for enabling the computer system 601 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616, e.g., network 110. For example, the communication interface 613 may be a wired or wireless network interface card or modem (e.g., with SIM card) configured to attach to any packet switched (wired or wireless) LAN or WWAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through the communications network 616. The network link 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613.

In summary, in one form, a method is provided. The method includes receiving configuration information from a plurality of network devices in a network, receiving traffic flow records from the plurality of network devices, receiving an indication of an intent to apply a new policy on the network devices, and based on the configuration information, traffic flow records and the new policy, determining an impact of the new policy on the network devices and traffic flowing through the network.

In one implementation, the configuration information comprises at least one of an amount of memory, processing power, stateful inspection capabilities, traffic copy capabilities, and traffic redirect capabilities available on respective network devices. In a particular implementation, the amount of memory comprises an amount of available ternary content-addressable memory (TCAM) on respective network devices.

The traffic flow records may be past traffic flow records and comprise NetFlow records.

In an embodiment, determining an impact of the new policy on the network devices and traffic flowing through the network comprises determining which of the network devices is impacted by the new policy. The method may further include determining whether network devices impacted by the new policy have sufficient resources to support the new policy The method may still further include determining whether the network devices impacted by the new policy can be augmented to support the new policy.

In an embodiment, determining an impact of the new policy on the network devices and traffic flowing through the network comprises determining whether traffic to flow through the network as a result of applying the new policy can be supported by the network.

The method may also include applying the policy on the network devices when the impact of the new policy on the network devices and traffic flowing through the network can be supported by the network.

In another embodiment, a device is provided. The device may include an interface unit configured to enable network communications, a memory, and one or more processors coupled to the interface unit and the memory, and configured to: receive configuration information from a plurality of network devices in a network, receive traffic flow records from the plurality of network devices, receive an indication of an intent to apply a new policy on the network devices, and based on the configuration information, traffic flow records and the new policy, determine an impact of the new policy on the network devices and traffic flowing through the network.

The configuration information may include at least one of an amount of memory, processing power, stateful inspection capabilities, traffic copy capabilities, and traffic redirect capabilities available on respective network devices.

The amount of memory may be an amount of available ternary content-addressable memory (TCAM) on respective network devices.

The traffic flow records may include records of past traffic flows, and may be NetFlow records.

In an embodiment, the one or more processors may be configured to determine an impact of the new policy on the network devices and traffic flowing through the network by determining which of the network devices is impacted by the new policy.

In another embodiment, the one or more processors may be configured to determine an impact of the new policy on the network devices and traffic flowing through the network by determining whether traffic to flow through the network as a result of applying the new policy is can be supported by the network.

In still another embodiment, a non-transitory tangible computer readable storage media encoded with instructions is provided that, when executed by at least one processor is configured to cause the processor to: receive configuration information from a plurality of network devices in a network, receive traffic flow records from the plurality of network devices, receive an indication of an intent to apply a new policy on the network devices, and based on the configuration information, traffic flow records and the new policy, determine an impact of the new policy on the network devices and traffic flowing through the network.

The computer readable storage media may further include instructions to cause the processor to determine an impact of the new policy on the network devices and traffic flowing through the network by determining which of the network devices is impacted by the new policy.

The computer readable storage media may further include instructions to cause the processor to determine an impact of the new policy on the network devices and traffic flowing through the network by determining whether traffic to flow through the network as a result of applying the new policy is can be supported by the network.

The above description is intended by way of example only. Various modifications and structural changes may be made therein without departing from the scope of the concepts described herein and within the scope and range of equivalents of the claims.

What is claimed is:

1. A method comprising:
receiving configuration information from a plurality of network devices in a network, wherein the configuration information comprises stateful inspection capabilities, traffic copy capabilities, and traffic redirect capabilities available on respective network devices;
receiving traffic flow records from the plurality of network devices;
generating a network device dependency map based on the traffic flow records;
receiving an indication of an intent to apply a new policy on the network devices;
based on the configuration information, the traffic flow records, the network device dependency map and the new policy, determining an impact of the new policy on the network devices and traffic flowing through the network;
based on the impact, determining whether network devices impacted by the new policy have sufficient resources to support the new policy; and
augmenting at least one of the network devices impacted by the new policy by at least one of adding memory to the at least one of the network devices impacted by the new policy or upgrading a processor of the at least one of the network devices impacted by the new policy.

2. The method of claim 1, wherein the configuration information comprises at least one of an amount of memory and processing power available on respective network devices.

3. The method of claim 2, wherein the amount of memory comprises an amount of available ternary content-addressable memory (TCAM) on respective network devices.

4. The method of claim 1, wherein the traffic flow records comprise records of past traffic flows.

5. The method of claim 4, wherein the traffic flow records comprise NetFlow records.

6. The method of claim 1, wherein determining an impact of the new policy on the network devices and traffic flowing through the network comprises determining which of the network devices is impacted by the new policy.

7. The method of claim 1, wherein determining an impact of the new policy on the network devices and traffic flowing through the network comprises determining whether traffic to flow through the network as a result of applying the new policy can be supported by the network.

8. The method of claim 1, further comprising applying the policy on the network devices when the impact of the new policy on the network devices and traffic flowing through the network can be supported by the network.

9. A device, comprising:
an interface unit configured to enable network communications;
a memory; and
one or more processors coupled to the interface unit and the memory, and configured to:
  receive configuration information from a plurality of network devices in a network, wherein the configuration information comprises stateful inspection capabilities, traffic copy capabilities, and traffic redirect capabilities available on respective network devices;
  receive traffic flow records from the plurality of network devices;
  generate a network device dependency map based on the traffic flow records;
  receive an indication of an intent to apply a new policy on the network devices;
  based on the configuration information, the traffic flow records, the network device dependency map and the new policy, determine an impact of the new policy on the network devices and traffic flowing through the network;
  based on the impact, determine whether network devices impacted by the new policy have sufficient resources to support the new policy; and
  augment at least one of the network devices impacted by the new policy by at least one of adding memory to the at least one of the network devices impacted by the new policy or upgrading a processor of the at least one of the network devices impacted by the new policy.

10. The device of claim 9, wherein the configuration information comprises at least one of an amount of memory and processing power available on respective network devices.

11. The device of claim 10, wherein the amount of memory comprises an amount of available ternary content-addressable memory (TCAM) on respective network devices.

12. The device of claim 9, wherein the traffic flow records comprise records of past traffic flows.

13. The device of claim 12, wherein the traffic flow records comprise NetFlow records.

14. The device of claim 9, wherein the one or more processors are configured to determine an impact of the new policy on the network devices and traffic flowing through the network by determining which of the network devices is impacted by the new policy.

15. The device of claim 9, wherein the one or more processors are configured to determine an impact of the new policy on the network devices and traffic flowing through the network by determining whether traffic to flow through the network as a result of applying the new policy can be supported by the network.

16. A non-transitory tangible computer readable storage media encoded with instructions that, when executed by at least one processor, is configured to cause the processor to:
  receive configuration information from a plurality of network devices in a network, wherein the configuration information comprises stateful inspection capabilities, traffic copy capabilities, and traffic redirect capabilities available on respective network devices;
  receive traffic flow records from the plurality of network devices;
  generate a network device dependency map based on the traffic flow records;
  receive an indication of an intent to apply a new policy on the network devices; and
  based on the configuration information, the traffic flow records, the network device dependency map and the new policy, determine an impact of the new policy on the network devices and traffic flowing through the network;
  based on the impact, determine whether network devices impacted by the new policy have sufficient resources to support the new policy; and
  augment at least one of the network devices impacted by the new policy by at least one of adding memory to the at least one of the network devices impacted by the new policy or upgrading a processor of the at least one of the network devices impacted by the new policy.

17. The computer readable storage media of claim 16, further comprising instructions to cause the processor to:
  determine an impact of the new policy on the network devices and traffic flowing through the network by determining which of the network devices is impacted by the new policy.

18. The computer readable storage media of claim 16, further comprising instructions to cause the processor to:
  determine an impact of the new policy on the network devices and traffic flowing through the network by determining whether traffic to flow through the network as a result of applying the new policy can be supported by the network.

* * * * *